(12) United States Patent
Acharyya et al.

(10) Patent No.: US 8,150,135 B2
(45) Date of Patent: Apr. 3, 2012

(54) IDENTIFYING RIBS IN LUNG X-RAYS (75) Inventors: Mausumi Acharyya, Bangalore (IN);
Sumit Chakravarty, Baltimore, MD
(US); Dinesh Mysore Siddu, Bangalore
(IN); Eliahu Ratner, Jerusalem (IL);
Alexandra Manevitch, Jerusalem (IL);
Jonathan Stoeckel, RB Hierden (NL)

(73) Assignees: Siemens Computer Aided Diagnosis Ltd., Jerusalem (IL); Siemens Information Systems Ltd., Mumbai (IN)

( * ) Notice: Subject to any disclaimer, the term of this patent is extended or adjusted under 35 U.S.C. 154(b) by 913 days.

(21) Appl. No.: 12/132,339

(22) Filed: Jun. 3, 2008

(65) Prior Publication Data

US 2008/0317322 A1 Dec. 25, 2008

Related U.S. Application Data

(60) Provisional application No. 60/941,826, filed on Jun. 4, 2007, provisional application No. 60/941,801, filed on Jun. 4, 2007, provisional application No. 60/941,811, filed on Jun. 4, 2007.

(51) Int. Cl.
*G06K 9/00* (2006.01)
(52) U.S. Cl. ........ 382/132; 382/128; 382/173; 382/199; 382/291
(58) Field of Classification Search .................. 382/128, 382/132
See application file for complete search history.

(56) References Cited

U.S. PATENT DOCUMENTS

| 5,289,374 | A | | 2/1994 | Doi et al. | |
|---|---|---|---|---|---|
| 5,668,888 | A | * | 9/1997 | Doi et al. | 382/132 |
| 6,694,046 | B2 | | 2/2004 | Doi et al. | |
| 6,760,468 | B1 | * | 7/2004 | Yeh et al. | 382/132 |
| 7,058,210 | B2 | * | 6/2006 | Mundy et al. | 382/128 |
| 7,257,245 | B2 | * | 8/2007 | Oosawa | 382/132 |
| 7,724,936 | B2 | * | 5/2010 | Oosawa | 382/132 |
| 7,840,055 | B2 | * | 11/2010 | Huo | 382/132 |
| 2006/0098854 | A1 | | 5/2006 | Oosawa | |
| 2009/0169087 | A1 | * | 7/2009 | Doi et al. | 382/132 |

OTHER PUBLICATIONS

Kazantsev et. al., "Statistical detection of defects in radiographic images in nondestructive testing", Dec. 21, 2001, Elsevier Science B.V., Signal Porcessing 82 (2002) pp. 791-801.*
Yaniv, Ziv, "Edge Detection" School of Engineer and Computer Science, The Hebrew University, Course Notes, Mar. 21, 2006.*
Fisher, et al., Gaussian Smoothing [online], Apr. 24, 2004 [retrieved on Jun. 29, 2011]. Retrieved from the Internet: <URL: http://homepages.inf.ed.ac.uk/rbf/HIPR2/gsmooth.htm>.*
Otsu, "A Thresholding Selection Method from Gray-Level Histograms", Jan. 1979, IEEE Transactions on Systems, Man and Cybernetics, vol. SMC-9, No. 1, pp. 62-66.*

(Continued)

*Primary Examiner* — Jason M Repko
*Assistant Examiner* — David Perlman
(74) *Attorney, Agent, or Firm* — Peter Robert Withstandley (57) ABSTRACT

A method of detecting lung nodules in an anterior posterior x-ray radiograph comprising the steps of: generating candidate regions in image showing changes in contrast above a threshold level, and eliminating false positives by eliminating edges assignable to organs by: identifying edges; categorizing and eliminating rib edges; categorizing and eliminating lung tissue edges, and categorizing and eliminating blood vessels.

13 Claims, 9 Drawing Sheets

OTHER PUBLICATIONS

Shen et. al., "Tracing Based Segmentation for the Labeling of Individual Rib Structures in Chest CT Volume Data", 2004, MICCAI 2004, LNCS 3217, pp. 967-974.*

Lo et. al., "Extraction of Rounded And Line Objects for the Improvement of Medical Image Pattern Recognition", 1995, IEEE, pp. 1802-1806.*

Lee et. al., "A straight line detection using principle component analysis", Jun. 22, 2006, Elsevier, Science Direction, Pattern Recognition Letters 27 (2006) pp. 1744-1754.*

Acharyya et al., "Use of random process-based fractal measure for characterization nodules and suspicious regions in lung", Proceedings of SPIE—The International Society for Optical Engineering, vol. 6915, No. 1, Jan. 1, 2008, pp. 69151F/1-69151F/7.

Chen et al., "Fractal Feature Analysis and Classification in Medical Imaging", IEEE Transactions on Medical Imaging, IEEE Service Center, Piscataway, NJ, vol. 8, No. 2, Jun. 1, 1989, pp. 133-142.

Park et al., "Detection and labeling ribs on expiration chest radiographs", Proceedings of the SPIE—The International Society for Optical Engineering, SPIE, Bellingham, VA, vol. 5030, Jan. 1, 2003, pp. 1021-1031.

Acharyya et al., "A novel method of partitioning regions in lungs and their usage in feature extraction for reducing false positives", Proceedings of the SPIE, vol. 6915, Mar. 6, 2008, pp. 69150Z/1-69150Z/7.

Samei et al., "Chapter 12: Effects of Anatomical Structure on Signal Detection", Handbook of Medical Imaging, vol. 1, 2000,pp. 654-683.

Sanada et al., "Image Feature Analysis and Computer-Aided Diagnosis in Digital Radiography: Automated Delineation of Posterior Ribs in Chest Images", Medical Physics, AIP, Melville, NY vol. 18, No. 5, Sep. 1, 1991, pp. 964-971.

Lo et al., "Extraction of rounded and line objects for the improvement of medical image pattern recognition", Nuclear Science Symposium and Medical Imaging Conference, 1994, 19991 IEEE Conference Record, Norfolk, VA Oct. 30-Nov. 5, 1994, New York, NY, IEEE, vol. 4, Oct. 30, 1994, pp. 1802-1806.

International Search Report including Notification of Transmittal of the International Search Report, International Search Report, and Written Opinion of the International Searching Authority, Jul. 11, 2008.

* cited by examiner

FIG. 14b-2
MAGNITUDE IMAGE

FIG. 14b-4
PROFILE 2

FIG. 14b-1
ORIGINAL IMAGE

FIG. 14b-3
PROFILE 1

IDENTIFYING RIBS IN LUNG X-RAYS

CROSS REFERENCE TO RELATED APPLICATION

The present application claims priority rights from U.S. Provisional Application No. 60/941,826, filed Jun. 4, 2007; U.S. Provisional Application No. 60/941,801, filed Jun. 4, 2007; and U.S. Provisional Application No. 60/941,811, filed Jun. 4, 2007.

FIELD OF THE INVENTION

The present invention relates to computer aided diagnosis (CAD), and particularly to imaging the thoracic cavity for lung examination purposes.

BACKGROUND TO THE INVENTION

The chest x-ray is the most commonly performed diagnostic x-ray examination. The heart, lungs, airway, blood vessels and the bones of the spine and chest are imaged in a painless medical test that helps in the diagnosis of medical conditions.

The chest x-ray is typically the first imaging test used to help diagnose causes of symptoms such as shortness of breath, fever, a bad or persistent cough, chest pain or injury. Its application helps in diagnosing and monitoring treatment for medical conditions such as pneumonia, lung cancer, emphysema and heart failure and other heart problems. It may be used to find fractures in ribs as well.

Pneumonia shows up on radiographs as patches and irregular whiter areas, indicative of higher x-ray absorption from fluid in the lungs. If the bronchi, which are usually not visible, can be seen, a diagnosis of bronchial pneumonia may be made. Shifts or shadows in the region corresponding to the hila (the central mediastinal surfaces of the lungs where the lung roots enter) may indicate emphysema or a pulmonary abscess. Apparent widening of the spaces between ribs suggests emphysema. Other pulmonary diseases may also be detected or suspected through chest x-ray examination.

Lung cancer usually shows up as some sort of abnormality on the chest radiograph. Hilar masses (enlargements at that part of the lungs where vessels and nerves enter) are one of the more common symptoms as are abnormal masses and fluid buildup on the outside surface of the lungs or surrounding areas. Interstitial lung disease, which is a large category of disorders, many of which are related to exposure of substances (such as asbestos fibers), may be detected on a chest x-ray as fiber like deposits, often in the lower portions of the lungs.

The lungs are situated within the rib cage. Because bones absorb x-rays to a larger extent than soft tissues, these appear as white stripes across the x-ray radiograph. The ribs curl around the body and consequently the rib shadow on the x-ray radiograph appear to cross each other. The cross-over points and the regions between the cross-over points appear as a pattern of almost parallelogram-like shapes. This pattern may disguise the shadows cast by nodules which may be aligned with the crossover points, with the spaces therebetween, with a single rib between the cross-over points, and frequently overlap two or three of these regions.

In addition to the rib cage, the blood vessels within the lung have higher density than the air filled spongy lung tissue and absorb more x-rays, thereby causing them to cast a shadow, i.e. appear lighter on the radiograph. The lungs themselves have edges and absorb more x-rays than the space in the thoracic cavity therearound.

Absolute absorption varies with the period of exposure, the strength of the x-ray source and the size of the patient. Details are resolved by contrast between regions, and thus CAD programs seek out and identify edges.

Although supposed to keep still and hold their breadth, keeping lungs inflated, patients may move or inhale or exhale during the exposure to x-rays, blurring the resultant radiography image somewhat. Since x-ray radiation may itself cause malignancies, radiologists are wary of repeatedly exposing patients to x-rays, particularly with pregnant women, the young, the elderly and/or the ill. With some systems, such as those using traditional film, it may be impossible to repeat the test once a problem is determined, as the patient is no longer available.

Lung cancer may manifest itself as one or more malignant nodule which is typically near-spherical and shows up as a near-circular whiter region on the lung tissue. The size of the nodule may be smaller, similar or larger than the rib crossover, and thus isolation and identification of nodules is not easy.

It is, of course, imperative to detect all resolvable nodules. To avoid unnecessary anxiety and to reduce costs of unnecessary biopsies; it is desirable to minimize false positives as well.

The skilled radiographer may manually pick out nodules, but to speed up the diagnostic procedure, Computer Aided Diagnostic (CAD) techniques are increasingly used.

One approach used is segmentation, where the borders of features such as the lung lobe itself and ribs are identified. This is not always possible and indeed, is not always necessary.

What is required is to identify candidate regions of interest and to then decide if they are nodules or false positives. Once identified as a nodule, it is then necessary to determine if it is benign or malignant. This may require a biopsy, but can sometimes be determined by monitoring the nodule over time.

'False negatives' where actual nodules or tumors are not identified as such or discarded as 'noise' or some artifact of the system are unacceptable. The occurrence of 'false positives' where some other feature such as a rib crossing shadow is mistakenly identified as being attributed to a tumor, should be minimized. In practice the elimination of false positives whilst avoiding false negatives is difficult since tumors may have similar dimensions to the width of ribs or the diameter of blood vessels within the lung, and x-ray images typically have poor contrast. When scanning the lung region of posterior anterior x-ray images to look for regions of varying contrast or edges, a large number of candidate regions turn out to be rib crossings and the like.

There is a need to provide alternative approaches and methods to computer aided diagnostics for examining chest x-rays and the present invention addresses this need.

SUMMARY OF THE INVENTION

In a first aspect, the present invention is directed to providing a method of detecting lung nodule shadows in an anterior posterior x-ray radiograph comprising the steps of:
  a. generating candidate sub images characterized by changes in contrast above a threshold level, and
  b. eliminating false positives by eliminating edges assignable to organ shadows by:
    i. identifying edges;
    ii. categorizing and eliminating rib shadow edges;
    iii. categorizing and eliminating lung tissue shadow edges, and
    iv. categorizing and eliminating blood vessel shadow edges.

Typically, the step of generating candidate sub images is achieved by a moving windows technique wherein a rectangular window comprising a dynamically growing pane and a frame therearound that is co-centered on a meet of their diagonals is moved sequentially over the radiograph and in each position, whiteness of area within the pane is compared with whiteness of area of frame region, such that locations of interest are considered as sub images for further analysis.

In one embodiment, the step i of edge detection uses a Canny edge detector method.

Optionally, the edge detection process for detecting edges in a radiograph comprising the steps of:
(a) Smoothing image f(x,y) to reduce noise and unwanted details and textures:
(b) calculating the magnitude of gradient image
(c) enhancing contrast to highlight real edges, but risking creation of spurious edges
(d) calculating a threshold value, and
(e) using the threshold value to suppress spurious edges by background suppression Optionally, the smoothing uses a Gaussian filter $$g(x,y) = G\sigma(x,y) \otimes f(x,y)$$

Wherein $$G\sigma(x, y) = \frac{1}{\sqrt{2\pi\sigma^2}} e^{-\left[\frac{x^2+y^2}{2\sigma^2}\right]}$$

Optionally, calculating the magnitude of gradient image mag(x,y) is in accordance with following equation:

$$mag(x, y) = \left|\frac{\partial g}{\partial x} + \frac{\partial g}{\partial y}\right|$$

Optionally, calculating a threshold value uses an Otsu threshold technique.

Optionally and preferably, step ii of categorizing and eliminating rib shadow edges comprises identifying a straightness of edge feature.

In one embodiment, the straightness of edge feature has a minimum significant straightness threshold.

In one embodiment, the step ii of categorizing and eliminating rib shadow edges comprises comparing angle of edge detected within the sub image with respect to an expected angle for rib shadow edges at a similar distance from centerline of body.

Optionally, the step ii comprises dividing the x-ray radiograph into six vertical areas corresponding to inner left zone, central left zone, outer left zone, inner right zone, central right zone and outer right zone, and identifying linear features having angles to horizontal within appropriate ranges as being rib shadows.

Optionally, the appropriate ranges are −5° to 25°; −20°−20°; 10° to 90°; −45° to 0°; 2° to 10° and −90° to −10° with respect to an axis at 3 O'clock such that counter-clockwise is considered positive.

Additionally or alternatively, the step ii of categorizing and eliminating rib shadow edges comprises identifying rib shadow edges and rib shadow crosses from modality and peak separation of gradient direction histograms.

Additionally or alternatively, the step ii of categorizing and eliminating rib shadow edges comprises identifying and differentiating between rib shadows, rib edge shadows and rib shadow crosses by identifying sharp intensity changes along spokes radiating from center of sub image at 45 degree angles, and summing such crosses over the spokes.

Additionally or alternatively, step ii of categorizing and eliminating rib shadow edges comprises implementation of a Hough transform.

Optionally, the step iii of identifying lung tissue edges comprises identifying a continuum across which contrast is above threshold amount having a length comprising less than 10 pixels.

In a second aspect, the present invention is directed to providing a method of identifying rib shadow edges in a sub image of an anterior posterior chest radiograph comprising the step of identifying edges and comparing angle of edge with respect to an expected angle for a rib shadow edge at a similar distance from a centerline of body.

In the present context, the following terms should be understood by the following definitions unless an alternative definition is clearly intended by context.

A candidate location is a region in a radiograph suspected of being a nodule shadow, due to change in contrast or edges. Such candidates may be indicative of nodular like structures in the lungs.

A nodule is a substantially spherical mass of denser tissue within the lung. Nodules thus cast circular shadows on radiography images.

A shadow is a region of relatively high x-ray absorbance and so when looking at conventional x-ray images, which are negative x-ray photographs; such regions appear lighter or whiter than their surroundings.

The term radiograph as used herein, relates to an x-ray photograph, typically the negative image formed by exposure of an x-ray sensitive material to x-rays transmitted through a patient.

BRIEF DESCRIPTION OF THE FIGURES

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

12c shows the gradient direction image extracted therefrom.

12d shows a corresponding gradient direction histogram.

DESCRIPTION OF THE EMBODIMENTS

The shadows of blood vessels and ribs in posterior anterior x-ray radiography images of the chest obscure nodules, making them difficult to identify.

Embodiments of the present invention are directed to detecting, identifying and correctly characterizing physiological features, particularly ribs and blood vessels which show up in x-ray radiographs, obscuring nodules and other irregularities of interest. Applications include training classifiers, improved CAD systems and faster more accurate diagnostics.

An edge detection scheme is employed. When looking for nodules and the like, by attributing edges appearing in posterior anterior x-ray images to ribs, blood vessels or edges of the lungs themselves, these may be discounted. Non-discounted edges are more likely to be nodules requiring further consideration. In this manner, the ratio of nodules to false positives is maximized and the effectiveness of CAD image analysis is improved.

Correct identification of candidates as being shadows cast by ribs, rib crossover points or blood vessels, enables the creation and build up of classification libraries. The effectiveness of systems including artificial intelligence algorithms, such as neural networks, may be optimized by correct identification and detection of such elements.

Figure 1:
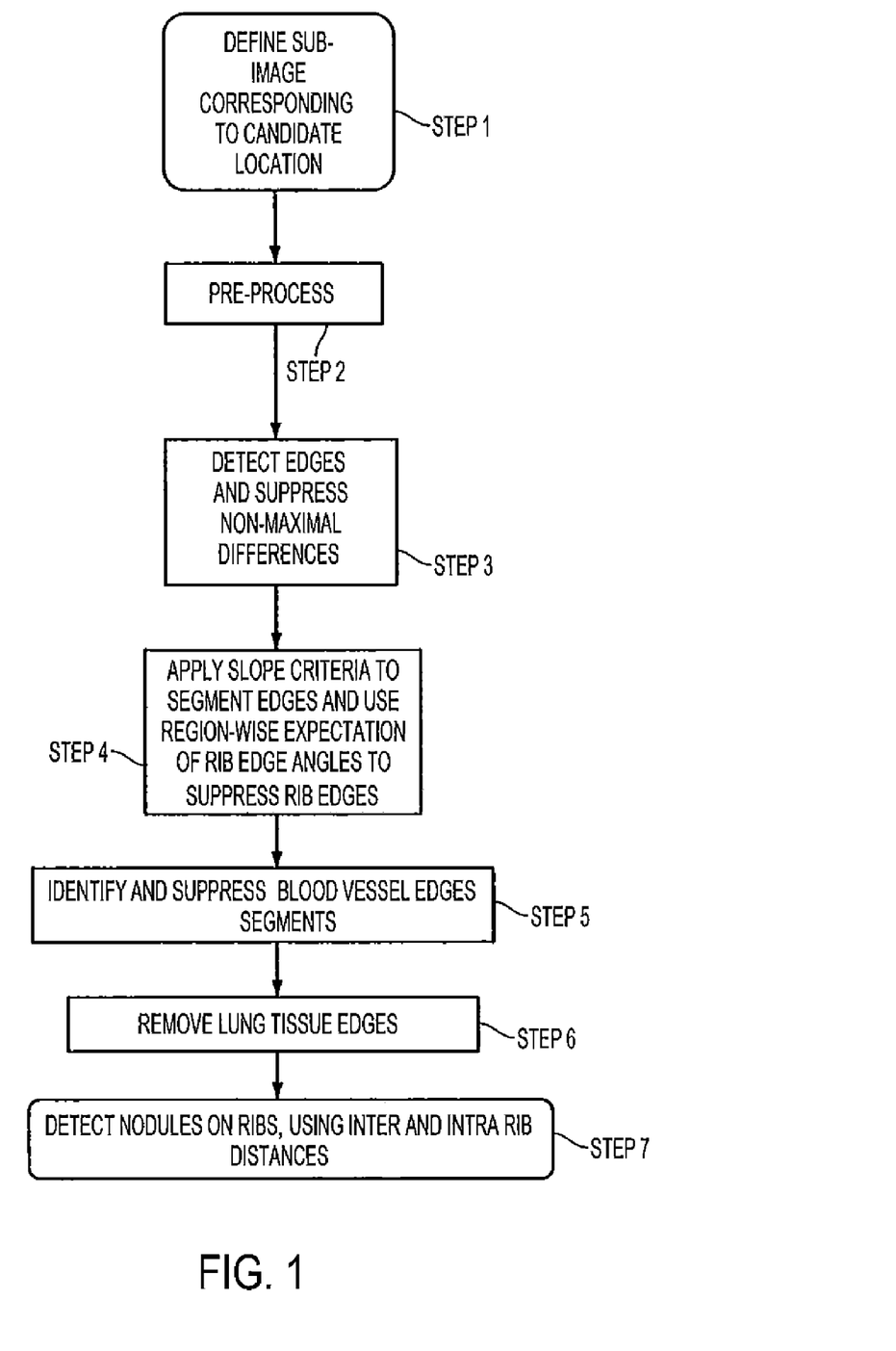
FIG. 1 is a flowchart presenting an overview of a methodology for analyzing chest x-ray images in accordance with one embodiment of the invention.

With reference to FIG. 1 an overview of this novel approach is presented.

Figure 2:
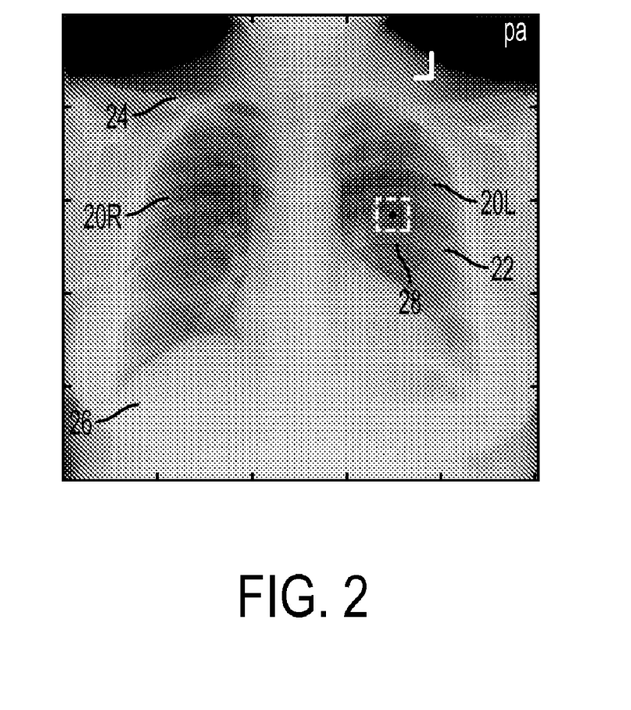
FIG. 2 is a typical, though high quality, anterior-posterior chest x-ray of a female patient.

Firstly, a sub-image corresponding to a candidate location is defined (step 1). In FIG. 2 such a candidate 28 is shown. The candidate location is preprocessed (step 2). The purpose of preprocessing is to enhance the contrast, to suppress spurious noise, and to extract intensity information. Edges within the sub image are detected (step 3), by defining contrast thresholds, such that lesser contrasting regions are suppressed. Next, a slope criterion is applied to identify edges corresponding to ribs and non ribs (step 4). A bimodal histogram may be used to differentiate between single rib and rib crosses and to thus identify rib cross features. By identifying and suppressing edges corresponding to rib edges, edges corresponding to blood vessels may be detected (step 5). Remaining, short pieces of edge fragment, typically no more than say, 10 pixels long, may be attributed as relating to the lung tissue itself (step 6). Having identified lung tissue edges, edges of blood vessels and rib edges and suppressed these, only edges not conforming to any of the above are left. Such edges may relate to nodules, inhaled objects, pneumonia and other features of interest. Remaining edges may now be examined without disruptive influence of other edges. Typically nodules are more or less spherical, and thus the existence of a circular edge is likely a nodule.

Rib edges, once positively identified as such may be suppressed to help detect and examine additional features. By looking at distances of apparent edges from clearly identified rib edges, and comparing to the inter rib and intra rib distances, the apparent edges can be identified as being or not being edges of adjacent ribs or opposite edges of the same rib, and positively identified as due to some other feature (step 7). In general, therefore, it is possible to identify the profiles of structures in the radiography image and to determine features that can be subsequently used by classifiers to classify structures as being due to ribs, rib crosses, lung tissue edges, blood vessels or nodules.

Rib edges, once positively identified as such may be suppressed to help detect and examine additional features. By looking at distances of apparent edges from clearly identified rib edges, and comparing to the inter rib and intra rib distances, the apparent edges can be identified as being or not being edges of adjacent ribs or opposite edges of the same rib, and positively identified as due to some other feature (step 8). In general, therefore, it is possible to identify the profiles of structures in the radiography image (step 9) and to determine features (step 10) that can be subsequently used by classifiers to classify structures as being due to ribs, rib crosses, lung tissue edges, blood vessels or nodules.

Edge Extraction

FIG. 2 is a typical posterior anterior x-ray radiograph of the chest of a female patient showing left 20L and right 20R lungs. These are, however, partially obscured by the shadow cast by the denser bone tissue of the ribs 22, the clavicle 24, and by the breast tissue 26. A candidate of interest 28 is shown.

Figure 3:
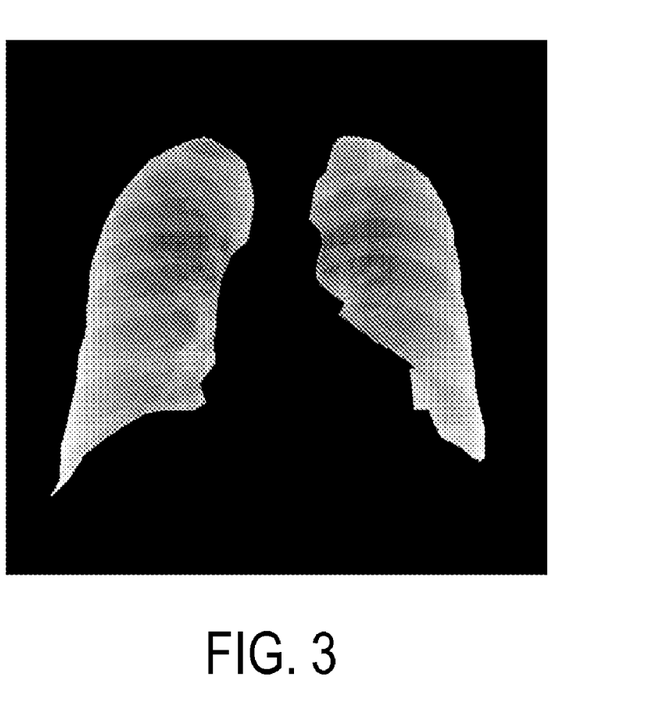
FIG. 3 shows the lungs after running a segmentation algorithm to show the lung region only.

FIG. 3 shows the lungs after running a segmentation algorithm of the prior art, such as that described in US20070127802A1 to Odry et al. titled "Method and System for Automatic Lung Segmentation", for example. The left and right lung shadows are partially obscured by rib shadows with several rib shadows shown. These appear as stripes across the image of the lung. The rib cage effectively curves around the lungs, and thus the shadows cast by the rib sections behind and in front of the lungs appear to cross each other. Shadows from other tissues are also seen. Some may be attributed to blood vessels or to healthy lung tissue. Others are cause for concern, being symptomatic of nodules and other tumors, fluid build up (pneumonia) and other undesirable causes. It is difficult and time consuming to analyze lung radiographs and to identify areas of interest.

Figure 4:
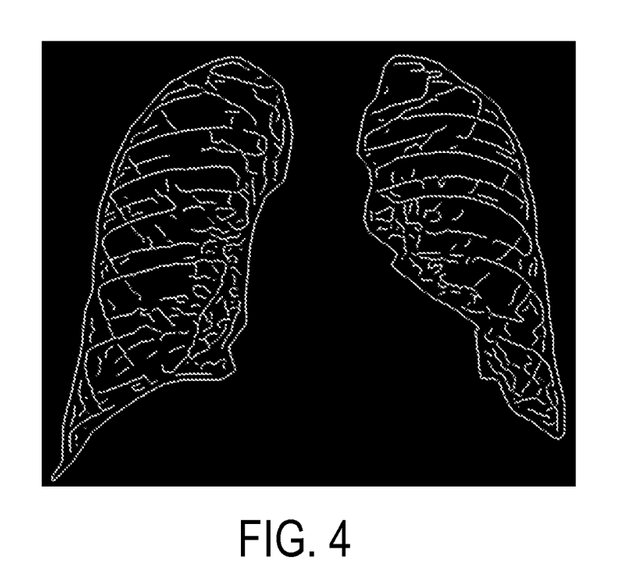
FIG. 4 shows the lungs of FIG. 3 after extracting edges.

To analyze the image, edge extraction is performed. This provides a corresponding image showing the edges only, as shown in FIG. 4.

Edge detection (FIG. 1 step 3) may use a modification of the Canny edge detector [H. Takeshi, F. Hiroshi and X. Jing, "Development of automated detection system for lung nodules in chest radiograms" IEEE Trans. on medical imaging 1. p.p. 71-74, 1997], for example.

The sub-steps of one possible edge detection process are:

(3a) Smoothing image f(x,y) with a Gaussian filter to reduce noise and unwanted details and textures:

$$g(x,y) = G_\sigma(x,y) \otimes f(x,y)$$

Where $$G\sigma(x, y) = \frac{1}{\sqrt{2\pi\sigma^2}} e^{-\left[\frac{x^2+y^2}{2\sigma^2}\right]}$$

(3b) calculating the magnitude of gradient image mag(x,y) as:

$$mag(x, y) = \left|\frac{\partial g}{\partial x}\right| + \left|\frac{\partial g}{\partial y}\right|$$

Figure 5:
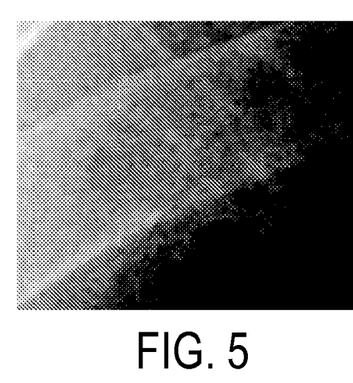
FIG. 5 is a sub image of the lung, i.e. a region of the lung image, perhaps selected by a moving window technique as including a candidate nodule.
Figure 6:
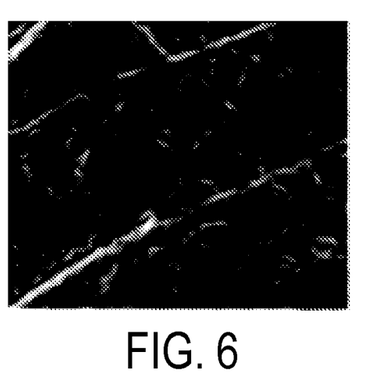
FIG. 6 is a magnitude image of the image of FIG. 5, showing spurious edges.

With reference to a specific sub-image of interest—FIG. 5, the magnitude of gradient image thus obtained is shown in FIG. 6. Since contrast is enhanced, real edges are highlighted, but spurious edges may be created.

Figure 7:
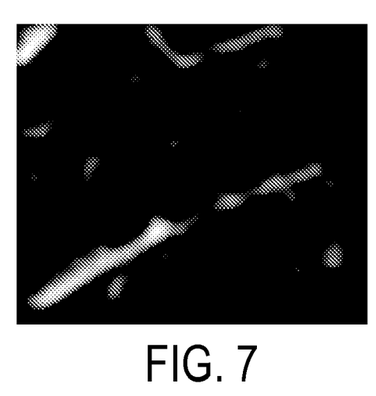
FIG. 7 is a processed image created from the magnitude image of FIG. 5 after applying the Otsu method and suppressing the lower magnitude values.
Figure 8:
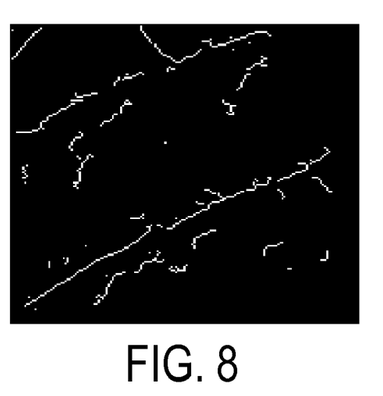
FIG. 8 is a black and white image corresponding to FIG. 7 after a non-maximum suppression and hysteresis threshold.

(3c) calculating a threshold value, perhaps using the Otsu thresholding technique [N. Otsu, "A threshold selection method from gray level histograms", IEEE Trans. Systems, Man and Cybernetics, 1979, vol. 9, p.p. 62-66], and the threshold value is used to suppress the lower magnitude values by background suppression—see FIG. 7—and non-maximum suppression followed by application of a hysteresis threshold. In this manner, a black and white image showing edges is generated—see FIG. 8.

Figure 9:
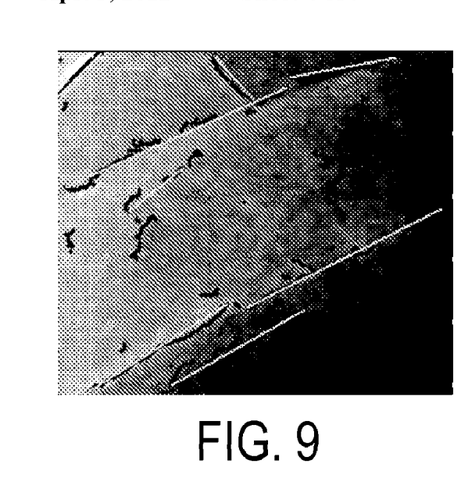
FIG. 9 shows how rib edges can be identified and line segments fitted therealong, to remove these from further consideration.

Edge linking and line segment fitting are now used to draw lines corresponding to the edges shown (FIG. 9), which may be variously attributed to the lung mass itself, to ribs, to blood vessel edges or to nodules.

Slope Criterion for Identification of Ribs

The slope criterion for identifying ribs (FIG. 1, Step 4) is now explained in more detail. The purpose of this step is to identify the edges shown in FIG. 9 as being rib edges or non-rib edges.

Figure 10:
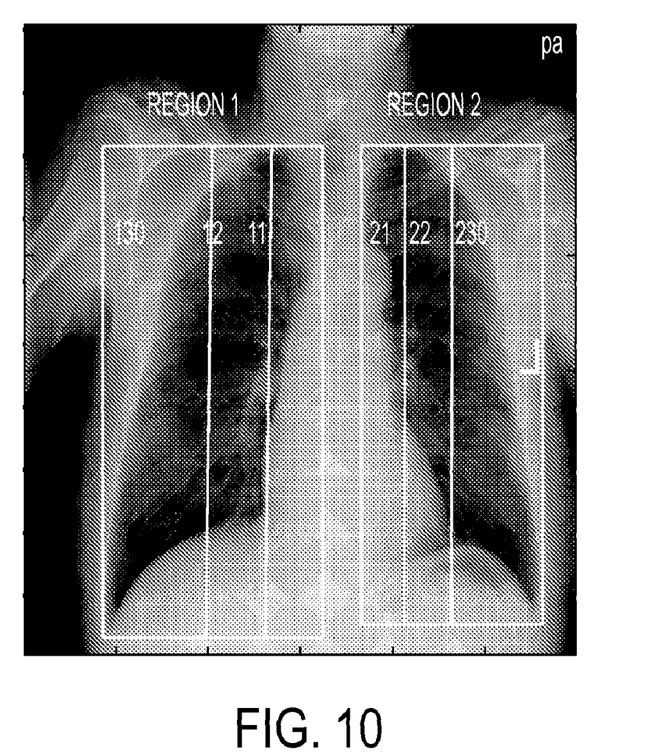
FIG. 10 is an anterior-posterior x-ray image with a grid superimposed thereupon dividing the thorax into zones wherein the rib angles are within specific and defined ranges.

With reference to FIG. 10, it has been found that the slope of the ribs varies with distance from the centerline of the body in a consistent and predictable manner. For convenience, six regions may be defined: Left inner 21; left middle 22; left outer 230; right inner 11; right middle region 12; right outer region 130. The range of angles between the ribs and the horizontal are summarized in table 1, where the zero angle is at 3 O'clock and counterclockwise angles are considered positive.

TABLE 1

Showing regions of chest and typical rib angles therewithin

| Region | Sub region | Rib Angle Range |
|---|---|---|
| Region 1 | 11 | [−5 25] |
| | 12 | [−20 20] |
| | 130 | [10 90] |
| Region2 | 21 | [−45 0] |
| | 22 | [20 10] |
| | 230 | [−90 −10] |

Thus continuous lines crossing the sub-image at appropriate angles for the specific region may be attributed as corresponding to rib edges. For practical purposes, such rib edges are generally not of interest, and are suppressed to allow identification and characterization of other edges within the sub-image. Thus the technique described hereinabove with reference to FIG. 10 and table 1 uses the defined region-wise slope criteria to identify segmented edges as being rib related or not.

It will be appreciated that once rib edges are correctly identified it is much easier to determine additional edges that may indicate nodules or blood vessels whose x-ray shadow may overlap the rib pattern.

Identifying Ribs and Rib Crosses from the Histogram of Gradient Direction Image

By edge detection and suppression of non-maxima features it is possible to extract profiles and to extract features for ribs and rib-crosses, and once these are identified, and accounted for, what is left is likely to be nodule related.

Figure 11A:
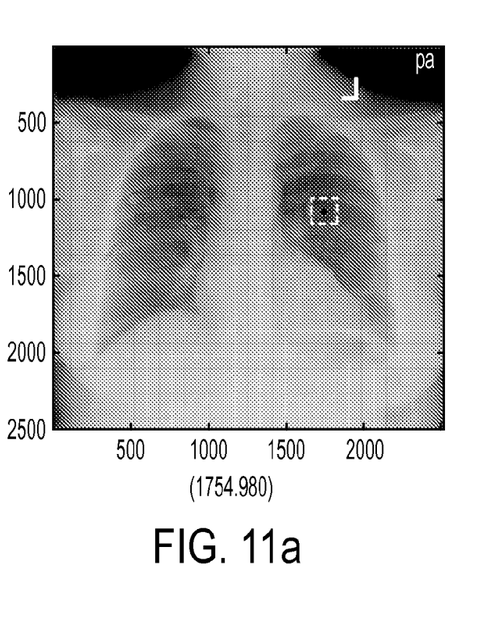
FIG. 11a is an anterior-posterior x-ray image showing a suspicious region (sub image) thereupon.
Figure 11B:
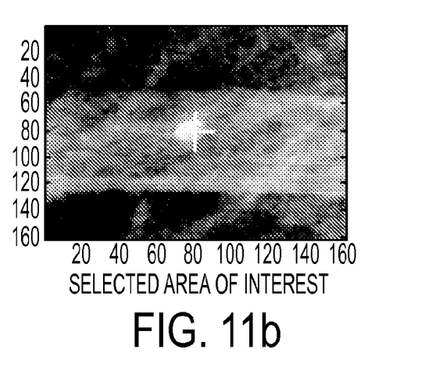
FIG. 11b shows the sub image on a larger scale after pre processing.
Figure 11C:
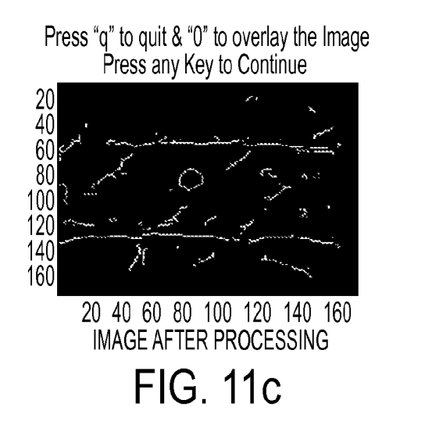
FIG. 11c shows the sub image with edges extracted.

FIG. 1 Step 5 relates to rib crossovers which occur at typical angles for each region. The correct identification of rib crossover regions is particularly significant since rib crossovers are a common cause of 'false positive' determinations, seeing that they are very similar in appearance to lung nodules and have been known to confuse both CAD systems and human operators. In FIG. 11a a candidate is indicated. In FIG. 11b a close up of the sub region centered around the candidate is shown and FIG. 11c is an image showing the edges of the same sub region. Here a small nodule on top of a rib is shown and it is relatively easy to diagnose as the edges thereof are well away from the rib edges; the diameter thereof is very much less than the width of ribs (intra rib edge separation), and than the distance between ribs (inter rib separation).

Unfortunately, the size of nodules may be much closer to that of rib widths or rib separation and the position of edges may be much more difficult to identify. To analyze non-rib shadows, it is important to determine the rib edge shadows in a sub image. Then areas of the sub-image may be identified as being on rib (intra rib), between rib (inter rib) and on rib-crossing. Having performed this type of analysis, the rib edges may be suppressed and non-rib related structures may be identified.

As explained hereabove with reference to FIG. 1, for each sub image, the gradient, magnitude and direction images are obtained and a histogram of the gradient direction image may be calculated (step 5). Generation of a gradient direction histogram allows positive identification of slopes and differentiation of ribs, rib crosses etc.

A gradient direction image is obtained and a gradient direction histogram is calculated. A bimodal distribution with the two modes separated by approx. 90° is indicative of a rib cross. In contradistinction, one rib edge produces a unimodal gradient direction, and the presence of opposite edges of the same rib, gives a bimodal histogram with the peaks separated by 180°, whereas a multimodal distribution without clear unimodal or bimodal characteristics indicates a lack of rib edges. In this manner, non-rib edge segments can be identified and considered as being related to blood vessels, nodules or other structures. Finally, nodules superimposed on ribs can be determined by the inter rib and intra rib distances since the edges attributed to opposite sides of the same rib, or to adjacent ribs can be identified by their separation.

Figure 12A:
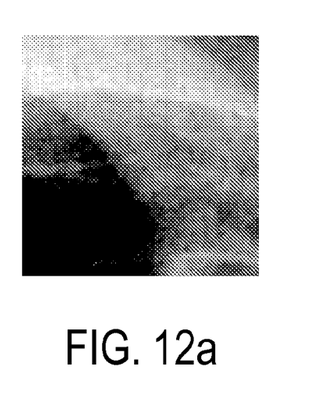
FIG. 12a depicts a sub image around a candidate.
Figure 12B:
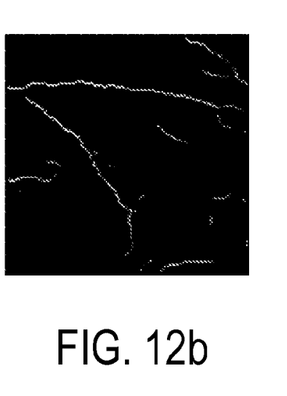
FIG. 12b shows the gradient magnitude image obtained after extracting edges and cleaning.
Figure 12C:
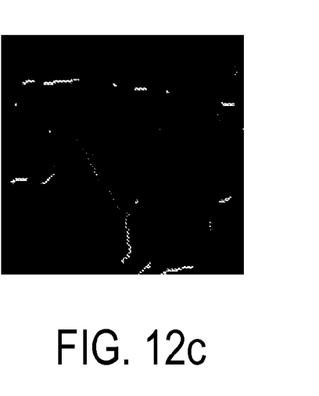
Figure 12D:
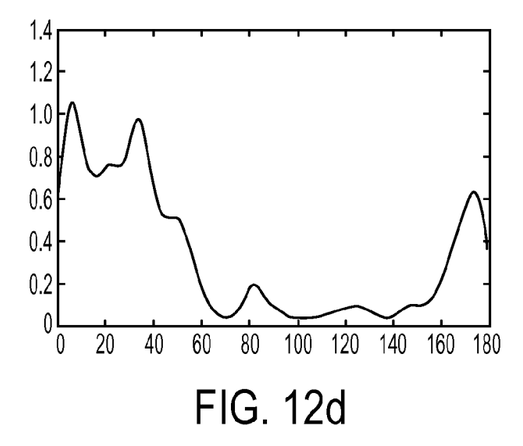

To explain the approach in more detail, reference is made to FIGS. 12a-d, wherein a sub image around a candidate is shown 12a, apparently indicating the edges of a rib and a rib cross. The gradient magnitude image obtained after extracting edges and cleaning is shown in FIG. 12b. From the gradient magnitude image, the gradient direction image is extracted 12c and a gradient direction histogram is calculated 12d. From the angles that the edges make to each other, the structure may be analyzed.

Nodules on Ribs and Between Ribs

Figure 13A:
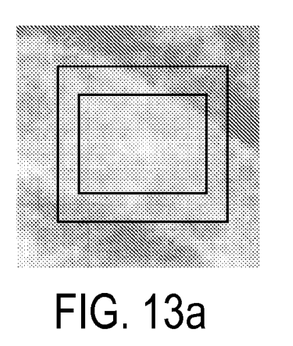
FIG. 13a is a candidate sub image isolated by a moving window technique, and centered on a nodule lying between ribs.
Figure 13B:
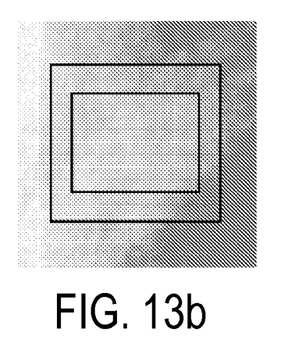
FIG. 13b is a candidate sub image isolated by a moving window technique, and centered on a nodule shadow superimposed on a rib.
Figure 13C:
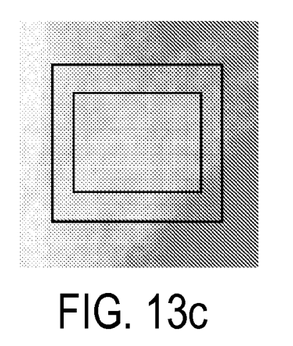
FIG. 13c is a candidate sub image isolated by a moving window technique showing a rib without an apparent nodule.

With reference to FIG. 13, a window frame approach may be used to center a pair of cocentered rectangles onto a candidate of interest, to provide a sub image corresponding to a candidate location. This is typically the process used to identify candidates (FIG. 1 step 1). Such an image is cleaned of spurious noise by preprocessing techniques (FIG. 1 step 2) as described hereinabove. By identifying shadows of ribs with anomalous high intensity thereon nodules superimposed on ribs may be hypothesized and tested for. Specifically, FIG. 13a is centered on a nodule lying between the ribs, 13b shows a nodule shadow superimposed on a rib, and 13c shows a rib without a nodule. To identify the nature of the candidate image, the edges are identified, gradient magnitude and gradient dimensions are extracted and a gradient histogram is generated in accordance with the methodology described hereinabove. Once edges are detected, their separation can be calculated and this helps ascertain if a region is between ribs (inter rib) or on a rib (intra rib). Similarly, crossing edges can be ascertained as being due to rib crosses. Once the rib related edges are correctly identified, it becomes easy to identify non-rib related edges. These may then be analyzed as being due to nodules, blood vessels etc.

Edginess

It will be appreciated, that the general approach utilized herein, is to extract features for different underlying causes and to use them to analyze candidate sub images. One feature particularly characteristic of ribs and rib crossings is that they include a relatively large amount of edges. Gradient magnitude information indicates the density of edges in the sub image. A spectral flatness measure feature may be defined as indicative of edge density and used in a classifier to identify edges. One such feature may be defined as the ratio of geometric mean to arithmetic mean of the magnitude of Fourier coefficients of the gradient magnitude image.

Rib Cross Extraction by Profiling in Compass Directions

Figure 14A:
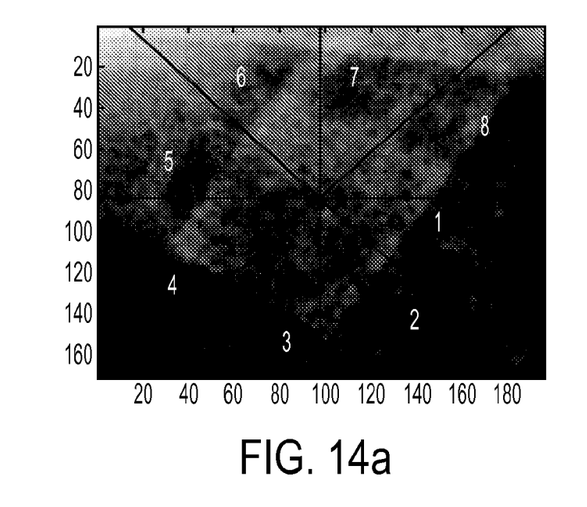
FIG. 14(a) shows a candidate sub region divided into 8 directions at 45° to each other.
Figure 14B:
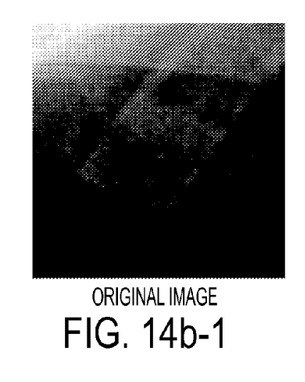
FIG. 14(b) shows the magnitude image and intensity profiles along the directions of FIG. 14(a).
Figure 14B:
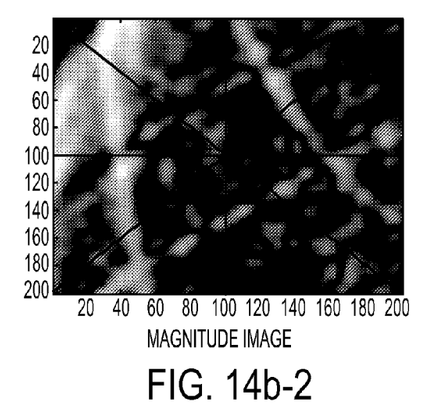
Figure 14B:
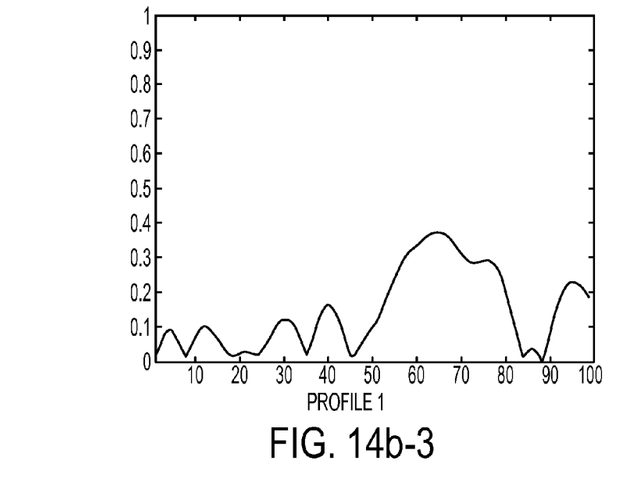
Figure 14B:
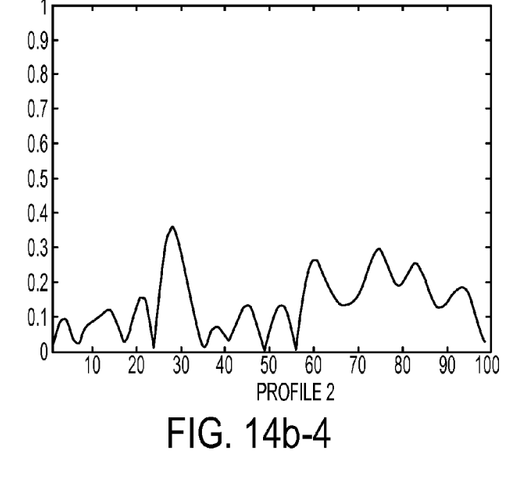
Figure 14B:
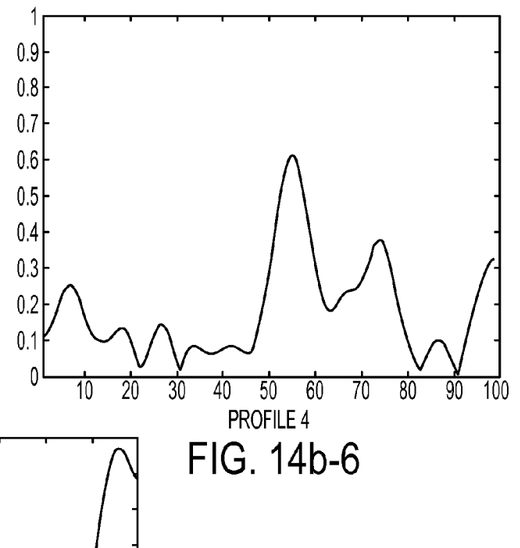
Figure 14B:
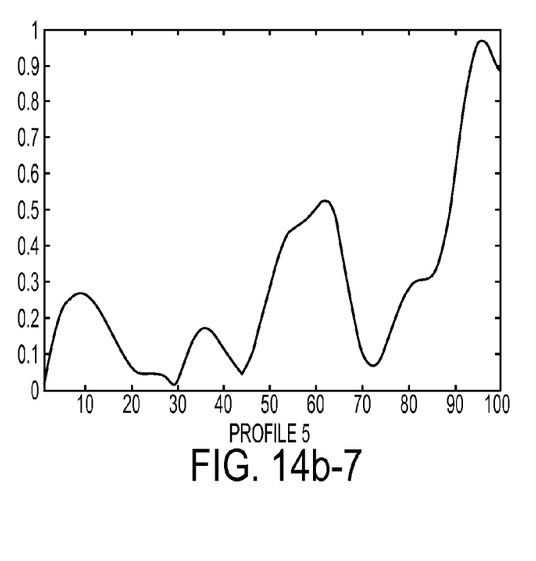
Figure 14B:
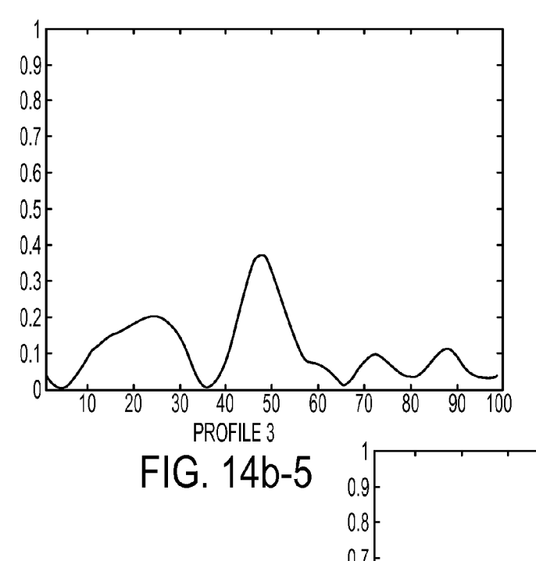
Figure 14B:
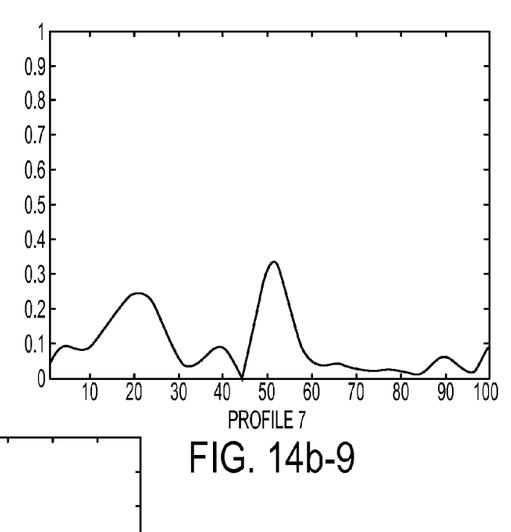
Figure 14B:
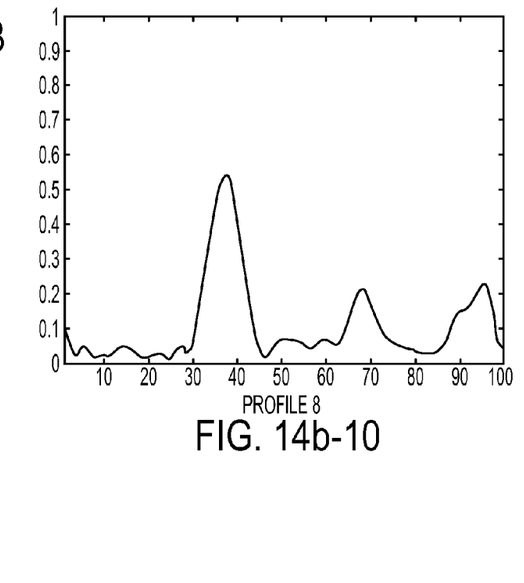
Figure 14B:
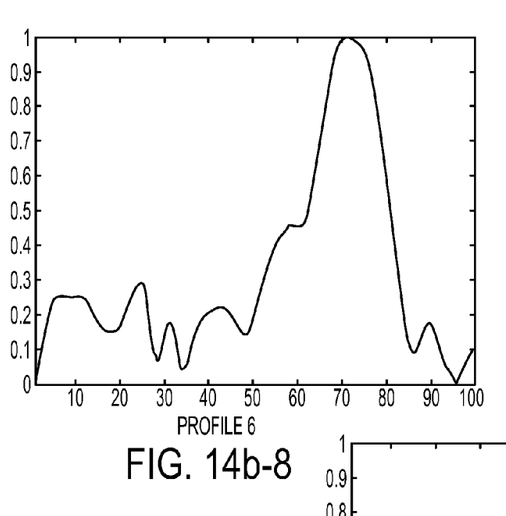

The approach described hereinabove identifies and differentiates between different rib related artifacts by considering edges and their relative angles. Similar information can be extracted by a different but complimentary approach, wherein the moving window technique is again used to center a sub image on a candidate of interest. However, the analysis of the candidate is not performed by identifying and extracting edges and determining their relative angles, but rather by examining directions radiating from the center of the sub image and identifying in which directions edges are encountered. With reference to FIG. 14(a), the approach may be summarized as follows: The sub image is sectioned by drawing four lines there across to establish eight radiating spokes separated by angles of 45° and multiples thereof. Shadow intensity profiles may be determined for each direction and from the intensity peaks, a decision as to whether a rib edge is crossed is made. For each spoke, if a rib is crossed, a value of 1 is assigned. If no ribs are crossed, a value 0 is assigned. The value for the sub image is the sum of the values for each spoke divided by 8.

$$F = \sum \frac{prof(i)}{8}$$

A number of features may be extracted in this manner, and used to train a classifier of a CAD system to recognize rib edges. Similarly, such features may be used to ascertain whether edges are rib related. Some such features are briefly detailed below.

Feature Peak Ratio:

From each extracted profiles along 8 directions, the ratio of maximum peak to minimum peak is computed. An overall peak ratio may be calculated by averaging the peak ratios computed individually on each profile.

Feature Ridge Width:

The thickness of the edge (ridge) from the profile at 30% of its peak value may be calculated and the average of ridge value may be defined, representing the average for all the eight directions.

Feature Slope Ratios:

First order derivatives of the profile may be calculated and Slope_min_ratio, Slope_max_ratio and slope_min_max_ratio for each profile may be obtained, defined as follows:

Slope_min_ratio=min(profdiff)/(abs(min(profdiff))+max(profdiff));

Slope_max_ratio=max(profdiff)/(abs(min(profdiff))+max(profdiff));

Slope_min_max_ratio=min(profdiff)/(max(profdiff));

An average for all the eight profiles may be calculated.

Feature Slope Smooth:

This feature gives the smoothness of the slope. For each profile a second order derivative is obtained and used to compute the steepness value, i.e. the sum of deviations from the mean. An average steepness value may be calculated from all the steepness values computed from all the profiles extracted in eight directions.

On-Rib:

A multiple quadrant approach may be used for rib edge detection based on the following steps:

a. Perform Residual Edge Labelling and linking to combine relevant edge segments to meet rib check criteria;
b. Check criteria to remove non-rib edge segments including check of segment length/slope/eccentricity factor;
c. Divide the sub image into multiple quadrants;
d. Keep the best fit segments for each quadrant.
e. Check the centroid distances among the best fit segments of each quadrant.

If the centroid distances are greater than rib distances then rib check is satisfied.

Further Features

The Hough transform technique may be used to extract features such as lines and crosses, in that it enables identification of underlining shapes and counting their numbers. It is an attractive tool since, as will be appreciated by the man of the art, it is tolerant of gaps in feature boundary descriptions and is relatively unaffected by image noise. The technique may be used for identifying shapes with known geometries, so is appropriate for extracting ribs and rib crosses. Peak features, ridge widths and slope ratios may be determined in this manner.

A Hough feature may thus be computed on the edge image corresponding to a candidate sub image. First a Hough transform is computed on the edge image, based on the 30% of peak value, and Hough lines are detected. Based on the theta values, the ratio of longest lines on the different facets may be computed.

It will be noted that the method of FIG. 1 could be varied by performing some of the steps in a different order. The various sub-routines described for extracting rib related features and for identifying rib edges could be used independently, for example in an edge classifier. Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A method of detecting lung nodule shadows in an anterior posterior x-ray radiograph comprising the steps of:
   a. generating candidate sub areas of the radiograph showing changes in contrast above a threshold level, and
   b. eliminating false positives by eliminating edges assignable to organ shadows by:
      i. identifying edges;
      ii. categorizing and eliminating rib shadow edges comprising dividing the x-ray radiograph into six vertical areas corresponding to inner left zone, central left zone, outer left zone, inner right zone, central right zone and outer right zone, and identifying linear features having angles subtended to horizontal within an appropriate range as being rib edges wherein the appropriate ranges are −5° to 25°; −20° to 20°; 10° to 90°; −45° to 0°; 2° to 10° and −90° to −10° with respect to a horizontal direction at 3 O'clock, such that counter-clockwise direction is considered positive;
      iii. categorizing and eliminating lung tissue shadow edges, and
      iv. categorizing and eliminating blood vessel shadow edges.

2. The method of claim 1 wherein the step of generating candidate regions is achieved by a moving windows technique wherein a rectangular window comprising a dynamically growing pane and a frame therearound co-centered on a meet of their diagonals is moved sequentially over the radiograph and for each position, whiteness of an area in the pane centered is compared to the whiteness of area of frame region.

3. The method of claim 1 wherein the step i of edge detection uses a Canny edge detector method.

4. The method of claim 1 wherein the edge detection process for detecting edges in a radiograph comprising the steps of:
   (a) Smoothing image f(x,y) to reduce noise and unwanted details and textures:
   (b) calculating the magnitude of gradient image
   (c) enhancing contrast to highlight real edges, but risking creation of spurious edges
   (d) calculating a threshold value, and
   (e) using the threshold value to suppress spurious edges by background suppression.

5. The method of claim 4 wherein the edge detection process wherein said smoothing uses a Gaussian filter $$g(x,y) = G_\sigma(x,y) \otimes f(x,y)$$

Wherein $$G\sigma(x, y) = \frac{1}{\sqrt{2\pi\sigma^2}} e^{-\left[\frac{x^2+y^2}{2\sigma^2}\right]}.$$

6. The method of claim 4 wherein said calculating the magnitude of gradient image mag(x,y) is in accordance with following equation:

$$mag(x, y) = \left|\frac{\partial g}{\partial x}\right| + \left|\frac{\partial g}{\partial y}\right|.$$

7. The method of claim 4 wherein said calculating a threshold value uses an Otsu threshold technique.

8. The method of claim 1 wherein the step ii of categorizing and eliminating rib edges comprises identifying a straightness of edge feature.

9. The method of claim 8 wherein the straightness of edge feature has a minimum significant straightness threshold, such that minor deviations from a straight line are considered straight.

10. The method of claim 1 wherein the step ii of categorizing and eliminating rib edges comprises comparing angle of an edge in the sub image with respect to an expected angle for a rib image at a similar distance from centerline of body.

11. The method of claim 1 wherein the step ii of categorizing and eliminating rib edges comprises identifying rib edges and rib crosses from modality and peak separation of gradient direction histograms.

12. The method of claim 1 wherein the step ii of categorizing and eliminating rib edges comprises identifying and differentiating between ribs, rib edges and rib crosses by identifying sharp intensity changes along spokes radiating from center of sub image at 45 degree angles, and summing such crosses over the spokes.

13. The method of claim 1 wherein the step ii of categorizing and eliminating rib edges comprises implementation of a Hough transform.

* * * * *